(12) United States Patent
Park et al.

(10) Patent No.: US 10,518,274 B2
(45) Date of Patent: Dec. 31, 2019

(54) FLOCCULATION BASIN INCLUSION OR EXCLUSION TYPE WATER TREATMENT APPARATUS USING DISSOLVED AIR FLOTATION

(71) Applicant: DOOSAN HEAVY INDUSTRIES & CONSTRUCTION CO., LTD., Changwon-si (KR)

(72) Inventors: Sung Won Park, Goyang-si (KR); Byung Sung Park, Incheon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 159 days.

(21) Appl. No.: 15/804,686

(22) Filed: Nov. 6, 2017

(65) Prior Publication Data

US 2018/0126391 A1    May 10, 2018

Related U.S. Application Data

(63) Continuation of application No. 14/679,308, filed on Apr. 6, 2015, now Pat. No. 9,839,918.

(30) Foreign Application Priority Data

Apr. 7, 2014   (KR) .................. 10-2014-0041148

(51) Int. Cl.
   *C02F 1/24*      (2006.01)
   *B01F 3/04*      (2006.01)
   (Continued)

(52) U.S. Cl.
   CPC .............. *B03D 1/1431* (2013.01); *B01F 3/04* (2013.01); *B03D 1/24* (2013.01); *C02F 1/24* (2013.01);
   (Continued)

(58) Field of Classification Search
   CPC . B03D 1/1431; B03D 1/24; B01F 3/04; C02F 1/24
   See application file for complete search history.

(56) References Cited

U.S. PATENT DOCUMENTS

| 9,138,752 B2 | 9/2015 | Amato et al. |
| 2007/0040051 A1 | 2/2007 | Blaney et al. |

(Continued)

FOREIGN PATENT DOCUMENTS

| JP | 2007167557 A | 7/2007 |
| KR | 1020000037345 A | 7/2000 |

(Continued)

OTHER PUBLICATIONS

European Search Report dated Aug. 18, 2015, issued in corresponding European Patent Application No. 15162648.8.

*Primary Examiner* — Robert A Hopkins
(74) *Attorney, Agent, or Firm* — Invenstone Patent, LLC

(57) ABSTRACT

Disclosed herein is a flocculation basin inclusion ion type water treatment apparatus using dissolved air floatation which includes: a flocculation basin which forms flocs by mixing a coagulant inserted into feed water and grows up the flocs; a contact zone to which fine bubbles are induced through a nozzle disposed at a lower part; and a separation zone which removes the flocs when the fine bubbles are attached to the flocs and the flocs float on the surface of water, the flocculation basin inclusion type water treatment apparatus including: a fine bubble forming part.

18 Claims, 11 Drawing Sheets

(51) Int. Cl.
    *B03D 1/24*         (2006.01)
    *B03D 1/14*         (2006.01)
    *C02F 1/52*         (2006.01)
    *C02F 1/56*         (2006.01)

(52) U.S. Cl.
    CPC .............. *C02F 1/5281* (2013.01); *C02F 1/52* (2013.01); *C02F 1/56* (2013.01); *C02F 2301/043* (2013.01); *C02F 2303/24* (2013.01)

(56) References Cited

U.S. PATENT DOCUMENTS

2012/0193294 A1     8/2012   Amato et al.
2014/0083845 A1     3/2014   Han et al.

FOREIGN PATENT DOCUMENTS

| | | |
|---|---|---|
| KR | 10-2007-0064246 A | 6/2007 |
| KR | 10-2011-0071481 A | 6/2011 |
| KR | 10-1094188 B1 | 12/2011 |
| KR | 1020120068110 A | 6/2012 |
| KR | 10-2013-0078327 A | 7/2013 |
| KR | 101348591 B1 | 1/2014 |

FLOCCULATION BASIN INCLUSION OR EXCLUSION TYPE WATER TREATMENT APPARATUS USING DISSOLVED AIR FLOTATION

CROSS-REFERENCE TO RELATED APPLICATION

This application is a continuation application of U.S. application Ser. No. 14/679,308, filed Apr. 6, 2015, which claims priority from Korean Application No. 10-2014-0041148, filed Apr. 7, 2014, the contents of which are incorporated herein by reference in their entireties.

BACKGROUND

Apparatuses consistent with exemplary embodiment relate to a flocculation basin inclusion or exclusion type water treatment apparatus using dissolved air floatation, and more particularly, to a water treatment apparatus using dissolved air floatation which uses not the final treated water but the initial feed water to form saturated water to generate fine bubbles.

In general, a water treatment apparatus is an apparatus which produces fresh water using seawater to utilize the fresh water as water for living, eating or industrial use or properly treat raw water to purify waste water. Such a water treatment apparatus includes a device for removing foreign matters mixed in raw water.

As a unit process for removing foreign matters, there is dissolved air floatation (DAF). The dissolved air floatation is a method of mixing a coagulant to raw water to be treated to flocculate foreign matters contained in the raw water and raising the flocculate foreign matters together with fine bubbles to the surface to remove them, and is applied as a pretreatment process in the entire water treatment facilities or seawater desalination facilities.

Referring to FIG. 1, a conventional dissolved air floatation apparatus will be described in detail. When a coagulant is inserted into feed water to flocculate algae, suspended solids of low density or particulates, such as organic compounds, or floating materials contained in the feed water. In a flocculation basin 1, the feed water to which the coagulant is inserted is mixed through a stirrer and the mixture grows up to a floc size suitable for floatation.

"Floc" means a large mass that fine particles, such as suspended solids, organic matters and inorganic matters, contained in the raw water are flocculated by the coagulant, and generally means a collected thing formed by flocculation of particles of 0.1 μm or more. Flocs of small size or density which cannot be removed through filtration or precipitation are floated onto the surface of water to be removed using the dissolved air floatation.

The flocs generated and grown up in the flocculation basin 1 is transferred to a contact zone 2 and is floated to the surface of water by colliding and connecting with fine bubbles generated from the lower to be floated to the surface of water, and then, are removed through a scum removal device in a separation zone 3.

In the meantime, the conventional dissolved air floatation apparatus separates a recycling flow, which is some of treated water of the end product, by piping, sends the recycling flow to a saturator 7 through a pump 5, and saturates the recycling flow by supplying compressed air of 4 to 7 bars using an air compressor 6 so as to realize a rapid pressure drop through a nozzle 4 mounted at a lower part of the contact zone 2, such that fine bubbles are formed in the contact zone 2.

In general, a flow rate of the recycling flow separated from the treated water is about 10 to 20% of feed water, and can enhance performance of the apparatus because the quantity of generated fine bubbles increases when the flow rate of the recycling flow is increased. However, when the flow rate of the recycling flow is increased, the flow velocity in the separation zone 3 is increased and the flocculated bodies of the flocs and fine bubbles are not floated and are discharged to the following process.

The surface loading rate which is a performance index of the dissolved air floatation apparatus was lower than the theoretical rise speed of bubbles, which was 5 to 15 m/hr, but recently, there is a high rate DAF which has a surface loading rate of 20 to 40 m/hr. However, as described above, because the surface loading rate is faster than the rise speed of bubbles, if the floatation basin is designed in an error, contaminants and bubbles are discharged out together with the treated water, and hence, it may damage to the following process, and the actual surface loading rate may fall short of the surface loading rate because fine bubbles are generated using the recycling flow that the final treated water is separated by piping.

BRIEF SUMMARY

Accordingly, exemplary embodiments have been made to solve the above-mentioned problems occurring in the prior arts, and it is an object of the present invention to provide a flocculation basin inclusion or exclusion type water treatment apparatus using dissolved air floatation which separates not final treated water but some of initial feed water and mixes and saturates air into the separated feed water to utilize it to generate fine bubbles, thereby enhancing efficiency of the apparatus.

To accomplish the above object, according to an aspect of an exemplary embodiment, there is provided a flocculation basin inclusion type water treatment apparatus using dissolved air floatation (DAF) which includes: a flocculation basin which forms flocs by mixing a coagulant inserted into feed water and grows up the flocs; a contact zone to which fine bubbles are induced through a nozzle disposed at a lower part; and a separation zone which removes the flocs when the fine bubbles are attached to the flocs and the flocs float on the surface of water, the flocculation basin inclusion type water treatment apparatus including: a fine bubble forming part which separates some of the feed water of the upstream side of the flocculation basin by piping, forms saturated water using the separated water and supplies the saturated water to the nozzle.

In this instance, the fine bubble forming part may include: an intake pipe for supplying air to the separated upstream side feed water; a mixing pump for pumping the supplied air and the feed water; and a saturator for saturating the supplied air to the pumped feed water. The fine bubble forming part may further include an adjuvant injection part for supplying an adjuvant to make the fine bubbles have positive charges. Preferably, the adjuvant injection part is disposed on a pipe of the upstream side of the intake pipe, on a pipe between the intake pipe and the mixing pump, or on a pipe between the mixing pump and the saturator. More preferably, the fine bubble forming part may further include a strainer for removing solid matters through pretreatment of the separated upstream side feed water.

In the meantime, to accomplish the above object, according to an aspect of another exemplary embodiment, the fine bubble forming part may include: a mixing pump (520) for pumping the separated upstream side feed water; a saturator for saturating air to the pumped feed water; and an air compressor for supplying compressed air to the saturator.

In this instance, the fine bubble forming part may further include an adjuvant injection part for supplying an adjuvant to make the fine bubbles have positive charges. The adjuvant injection part is disposed on a pipe of the upstream side of the mixing pump or on a pipe between the mixing pump and the saturator.

Moreover, the saturator may include: a chamber having a first flow path in which a first fluid flows; and at least one porous tube body which is arranged inside the chamber, extends side by side with the first flow path and has a second flow path in which a second fluid flows. The first fluid and the second fluid are compressed air and the pumped feed water or the pumped feed water and compressed air, and the porous tube body prevents the pumped feed water from passing but allows passing of the compressed air.

In the meantime, to accomplish the above object, according to an aspect of an exemplary embodiment of, there is provided a flocculation basin exclusion type water treatment apparatus using dissolved air floatation (DAF) which includes: a contact zone to which fine bubbles are supplied through a nozzle disposed at a lower part and which supplies the fine bubbles to flocs formed in feed water to which a coagulant is mixed; and a separation zone which removes the flocs when the fine bubbles are attached to the flocs and the flocs float on the surface of water, the flocculation basin exclusion type water treatment apparatus including: a fine bubble forming part which separates some of the feed water of the upstream side of the flocculation basin by piping, forms saturated water using the separated water and supplies the saturated water to the nozzle. The nozzle may include: a housing which is formed in a tube shape and has an inlet formed at one side and an outlet formed at the other side; a nozzle connection part which is joined to the inlet and has an inflow duct formed in the longitudinal direction; and a nozzle body which is inserted and mounted into the housing and has a collision part formed at a front half part to change a flow direction of the fluid induced along the inflow duct to collide with the inner wall of the housing, a plurality of cut portions formed in the side to form a plurality of side flow paths between the nozzle body and the inner wall of the housing, a spurt hole formed at the rear half part, a collision plate formed in the spurt hole, and an orifice formed between the cut portion and the spurt hole, such that the fluid sprayed through the orifice collides against the collision plate.

Furthermore, the fine bubble forming part may include: an intake pipe for supplying air to the separated upstream side feed water; a mixing pump for pumping the supplied air and the feed water; and a saturator for saturating the supplied air to the pumped feed water.

Additionally, the fine bubble forming part may further include an adjuvant injection part for supplying an adjuvant to make the fine bubbles have positive charges.

In addition, the fine bubble forming part may further include a strainer for removing solid matters through pretreatment of the separated upstream side feed water.

Accord to an aspect of an exemplary embodiment, there is provided a flocculation basin inclusion type water treatment apparatus using dissolved air floatation (DAF) which includes: a flocculation basin which forms flocs by mixing a coagulant inserted into feed water and grows up the flocs; a contact zone to which fine bubbles are induced through a nozzle disposed at a lower part; and a separation zone which removes the flocs when the fine bubbles are attached to the flocs and the flocs float on the surface of water, the flocculation basin inclusion type water treatment apparatus including: a fine bubble forming part configured to separate a portion of the feed water at an upstream side of the flocculation basin by piping, configured to form saturated water using the separated portion of the feed water and configured to supply the saturated water to the nozzle.

The fine bubble forming part may include: an intake pipe configured to supply air to the separated portion of the feed water; a mixing pump configured to pump the air and the separated portion of the feed water; and a saturator configured to saturate the air supplied to the pumped feed water.

The fine bubble forming part may further include: an adjuvant injection part configured to supply an adjuvant to make the fine bubbles have positive charges.

The adjuvant injection part may be disposed on a pipe provided at an upstream side of the intake pipe.

The adjuvant injection part may be disposed on a pipe provided between the intake pipe and the mixing pump.

The adjuvant injection part may be disposed on a pipe provided between the mixing pump and the saturator.

The fine bubble forming part may further include: a strainer configured to remove solid matters through pretreatment of the separated portion of the feed water.

The fine bubble forming part may include: a mixing pump configured to pump the separated portion of the feed water; a saturator configured to saturate air pumped to the portion of feed water; and an air compressor configured to supply compressed air to the saturator.

The fine bubble forming part may further include: an adjuvant injection part configured to supply an adjuvant to make the fine bubbles have positive charges.

The adjuvant injection part may be disposed on a pipe of an upstream side of the mixing pump.

The adjuvant injection part may be disposed on a pipe provided between the mixing pump and the saturator.

The saturator may include: a chamber comprising a first flow path in which a first fluid flows; and a porous tube body arranged inside the chamber, extending in a parallel direction with the first flow path and comprising a second flow path in which a second fluid flows, wherein the first fluid and the second fluid are compressed air and the pumped feed water, respectively or the pumped feed water and compressed air, respectively, and wherein the porous tube body is configured to prevent the pumped feed water from passing and configured to allow passing of the compressed air.

According to an aspect of another exemplary embodiment, there is provided a flocculation basin exclusion type water treatment apparatus using dissolved air floatation (DAF) which includes: a contact zone to which fine bubbles are supplied through a nozzle disposed at a lower part and which supplies the fine bubbles to flocs formed in feed water to which a coagulant is mixed; and a separation zone which removes the flocs when the fine bubbles are attached to the flocs and the flocs float on the surface of water, the flocculation basin exclusion type water treatment apparatus including: a fine bubble forming part configured to separate a portion of the feed water at an upstream side of the flocculation basin by piping, configured to form saturated water using the separated portion of the feed water and configured to supply the saturated water to the nozzle, wherein the nozzle may include: a housing which is formed in a tube shape and has an inlet formed at a first side and an outlet formed at a second side opposite from the first side; a nozzle connection part which is joined to the inlet and has an inflow duct formed in a longitudinal direction; and a nozzle body which is inserted and mounted into the housing and includes: a collision part formed at a first half part to change a flow direction of fluid induced along the inflow duct to collide with an inner wall of the housing, a plurality of cut portions formed in a side of the nozzle body to form a plurality of side flow paths between the nozzle body and the inner wall of the housing, a spurt hole provided at a second half part opposite to the first half part, a collision plate provided in the spurt hole, and an orifice provided between a cut portion of the plurality of cut portions and the spurt hole, such that fluid sprayed through the orifice collides against the collision plate.

The flocculation basin inclusion or exclusion type water treatment apparatus using dissolved air floatation according to the present invention can reduce the size of the contact zone and the separation zone because forming the fine bubbles using not the treated water but some of the influence water, use the ambient air without using an air compressor, can be operated at lower pressure compared with the conventional saturator, reduce an amount of the coagulant used and omit the flocculation basin if necessary, thereby reducing facility expenses and installation expenses (CAPEX) and operation expenses (OPEX).

DETAILED DESCRIPTION

Reference will be now made in detail to exemplary embodiments of the disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Figure 1:
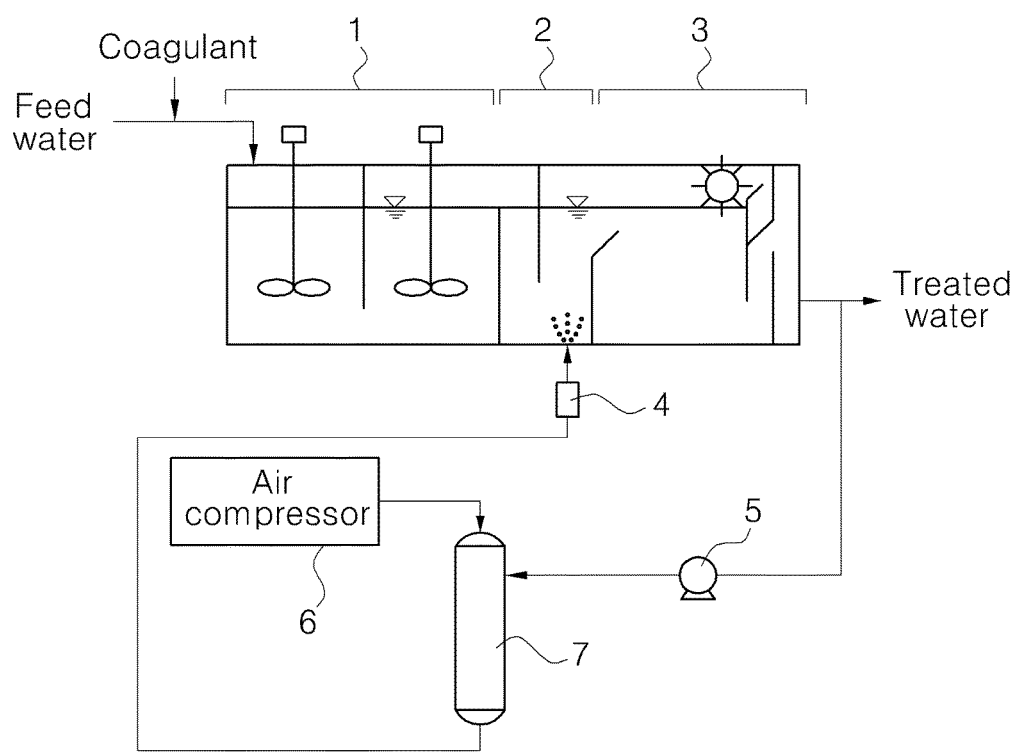
FIG. 1 is a mimetic diagram showing the whole facility of a dissolved air floatation apparatus of the related art.

Differently from the dissolved air floatation apparatus of the related art shown in FIG. 1, the exemplary embodiment provides a water treatment apparatus using dissolved air floatation, which separates not the final treated water but some of the initial feed water by piping to form saturated water to form fine bubbles.

Figure 2:
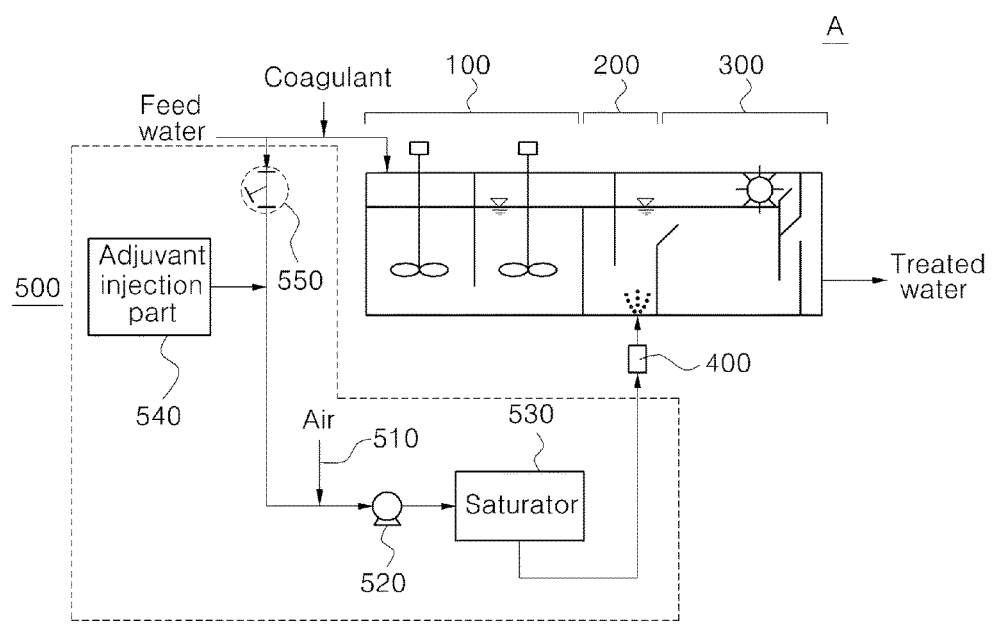
FIG. 2 is a mimetic diagram showing the whole facility of a flocculation basin inclusion type water treatment apparatus using dissolved air floatation according to an exemplary embodiment.

First, according to the exemplary embodiment, the water treatment apparatus (A) using dissolved air floatation which includes a flocculation basin 100, a contact zone 200 and a separation zone 300 further includes a fine bubble forming part 500 which forms saturated water using feed water of the upstream side of the flocculation basin 100, some of which is separated by piping, and supplies the saturated water to a nozzle 400 disposed at a lower part of the contact zone 200. FIG. 2 shows a brief mimetic diagram of the entire process of the water treatment apparatus. The exemplary embodiment is characterized in that the water treatment apparatus forms fine bubbles not using treated water but using feed water.

In this instance, the fine bubble forming part 500 includes: an intake pipe 510 for supplying air to the separated upstream side feed water; a mixing pump 520 for pumping the supplied air and the feed water; and a saturator 530 for saturating the supplied air to the pumped feed water.

A conventional saturator is a device to dissolve compressed air to treated water induced through a circulation pump and has a structure that a water collection space is formed at a lower part, a filler fills above the water collection space, and compressed air and water is induced to the top of the saturator and saturated water in which the compressed air is dissolved while passing through the filler is collected in the water collection space.

If not treated water but feed water is used, such a conventional saturator has a problem in that biofouling occurs due to formation of microorganisms on the filler of the saturator and it reduces saturation efficiency. If a saturator which has a high and big pressure container is used to enhance efficiency, it is more fatal.

Therefore, the exemplary embodiment proposes an improved inner structure of a saturator 530. Because the improved structure of the saturator can solve the problem that saturation efficiency is reduced due to biofouling, it can use not treated water but feed water, omit an air compressor, and can be operated at pressure of about 3 bar which is lower than pressure of 4 to 7 bar of the conventional saturator so as to reduce operation expenses.

Hereinafter, the saturator 530 according to the first preferred embodiment of the exemplary embodiment will be described in detail. The saturator 530 according to the preferred embodiment of the exemplary embodiment includes: a housing; a partition wall which extends from an inner wall of one side of the housing in the vertical direction not to reach an inner wall of the other side so as to form a flow path in the inner wall of the other side; and a plurality of fine pores formed on the partition wall. The saturator adopts the inner partition wall structure to induce turbulence of the feed water and air (induced air) inside the feed water flowing in the saturator so as to effectively saturate the air in the feed water even at relative small operation pressure (about 3 bar), control occurrence of biofouling due to the turbulence and provide economic feasibility because it can be operated without the air compressor.

Moreover, because the fine bubbles must have positive (+) charges in order to induce electrostatic connection with flocs formed in the feed water, the saturator can adopt fine bubble ionizer of various types, such as an electrolytic bath for electrolysis, preferably, further includes an adjuvant injection part 540 for supplying an adjuvant. Such an adjuvant may be iron salt-based coagulant, aluminum-based coagulant, and so on.

In this instance, the adjuvant injection part 540 may be disposed at various positions as occasion demands to supply the feed water to the pipe, but, preferably, is disposed at the pipe of the upstream side of the intake pipe 510, on the pipe between the intake pipe 510 and the mixing pump 520 or the pipe between the mixing pump 520 and the saturator 530. When the adjuvant is supplied to the initial feed water, the adjuvant is naturally and uniformly mixed during an air supply process through the intake pipe 510 of the rear end and during the pumping process through the mixing pump 520. If the adjuvant is supplied onto the pipe between the intake pipe 510 and the mixing pump 520 or supplied on the rear end of the mixing pump 520, it is easy to control the flow rate and pressure of the feed water.

Furthermore, the saturator may further include a strainer 550 for removing solid matters through pretreatment of the separated upstream side feed water. The strainer is a device to prevent foreign matters from being induced to the device by removing the solid matters contained in the fluid, and there are Y-shaped or U-shaped strainers which are containers generally made with an iron mesh in a steam pipe system or a water pipe system. The strainer 550 is disposed at the upstream side where the feed water is separated to first pretreat the feed water which contains solid matters more than treated water, thereby minimizing bad influences on each unit process of the fine bubble generation process.

Figure 3:
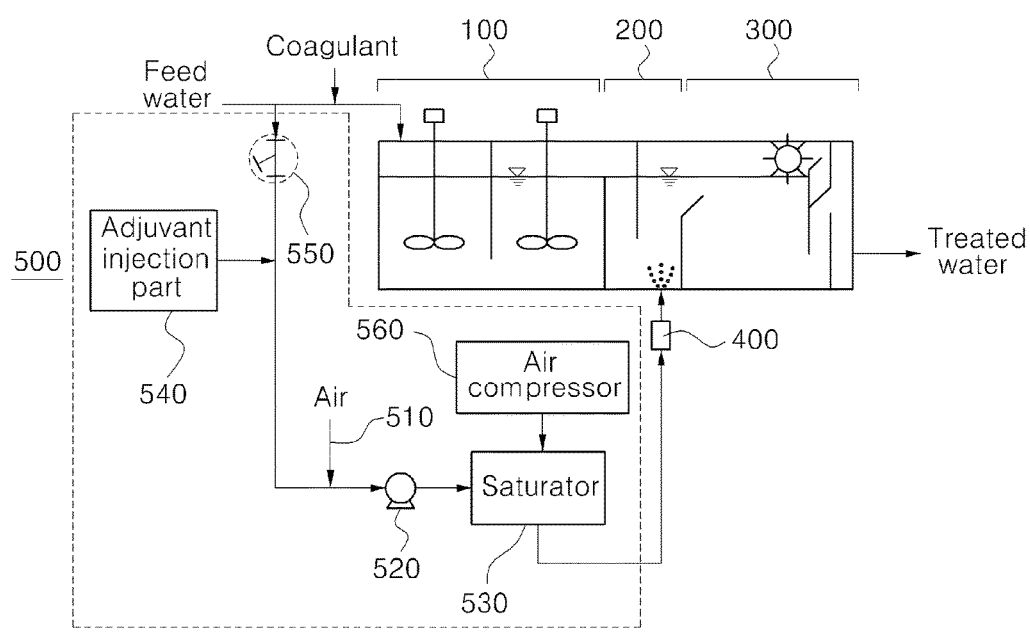
FIG. 3 is a mimetic diagram showing the whole facility of a flocculation basin inclusion type water treatment apparatus using dissolved air floatation according to an exemplary embodiment.

In the meantime, according to the exemplary embodiment, the water treatment apparatus (A) using dissolved air floatation which includes a flocculation basin 100, a contact zone 200 and a separation zone 300 further includes a fine bubble forming part 500 which forms saturated water using feed water of the upstream side of the flocculation basin 100, some of which is separated by piping, and supplies the saturated water to a nozzle 400 disposed at a lower part of the contact zone 200. FIG. 3 shows a brief mimetic diagram of the entire process of the water treatment apparatus. Like the previously discussed embodiment, the exemplary embodiment is characterized in that the water treatment apparatus forms fine bubbles not using treated water but using feed water.

In the water treatment apparatus according to the exemplary embodiment, differently from the first preferred embodiment, the fine bubble forming part 500 includes: a mixing pump 520 for pumping the separated upstream side feed water; a saturator 530 for saturating air to the pumped feed water; and an air compressor 560 for supplying compressed air to the saturator.

In more detail, the second preferred embodiment adopts an in-line type saturator differently from the first preferred embodiment to enhance a dissolution rate by increasing a contact area of compressed air, increase dissolution speed by inducing generation of turbulence, provide a free arrangement and reduce installation expenses and maintenance expenses by improving the structure of the saturator, and simply control a flow rate of saturated water.

Figure 5:
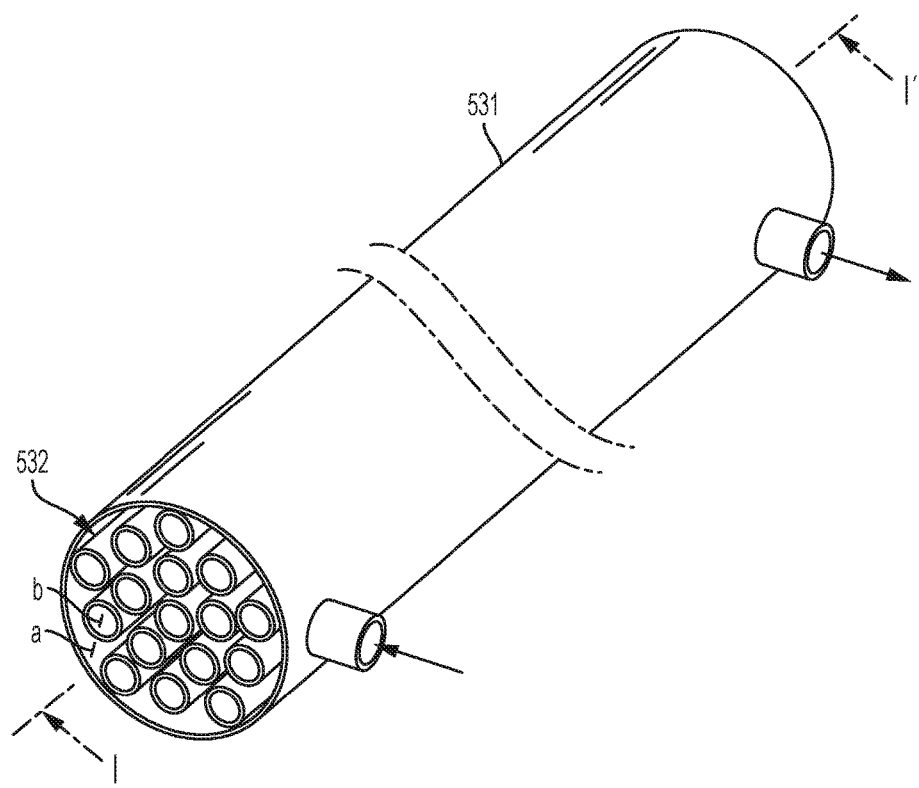
FIG. 5 is a mimetic diagram showing a saturator according to an exemplary embodiment.
Figure 6:
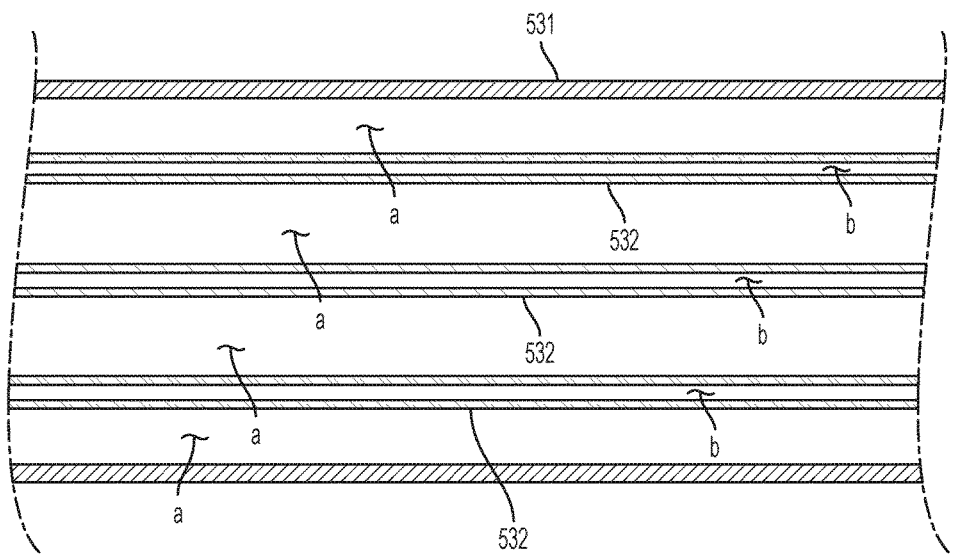
FIG. 6 is a cross-sectional view taken along the line of I-I' of FIG. 5.

Hereinafter, the saturator 530 according to the exemplary embodiment will be described in detail. The saturator 530 includes: a chamber 531 having a first flow path (a) in which a first fluid flows; and at least one porous tube body 532 which is arranged inside the chamber 531, extends side by side with the first flow path (a) and has a second flow path (b) in which a second fluid flows. FIG. 5 is a mimetic diagram of the saturator 530 according to the exemplary embodiment, and FIG. 6 is a cross-sectional view taken along the line of I-I' of FIG. 5.

The first fluid and the second fluid may be compressed air and the pumped feed water or the pumped feed water and compressed air. That is, when compressed air flows in the first flow path (a), the pumped feed water flows inside the second flow path (b). When the pumped feed water flows in the first flow path (a), the compressed air flows in the second flow path (b). The flow directions of the compressed air and the pumped feed water may be the same direction or the opposite directions to each other. However, in the exemplary embodiment, the upstream side and the downstream side of the flow path are defined based on the direction that the pumped feed water flows.

The chamber 531 is a tube body having the first flow path (a) therein, may be a hollow cylinder, and in this instance, the hollow part forms the first flow path (a). However, the shape of the chamber 531 is not limited to the above, may adopt any form that the compressed air can be dissolved in the feed water, for instance, may be a tube body which has a polygonal form in cross section.

The porous tube body 532 is arranged inside the chamber 531, extends side by side with the first flow path (a), and is a tube body forming the second flow path (b) in which the second fluid flows. Such a porous tube body 532 may be a hollow cylinder, and in this instance, the hollow part forms the second flow path (b). However, like the chamber 531, the porous tube body may be a tube body which has a polygonal form in cross section.

The porous tube body 532 is a membrane having a plurality of pores formed in the wall, so that the compressed air can pass through the wall of the porous tube body 532 but the pumped feed water hardly passes the wall. Therefore, the pores formed in the wall of the porous tube body 532 have an average diameter of 500 μm or less, preferably, within a range of 1 μm to 100 μm. If the pores are too small, there is a loss of pressure, but if the pores are too big, the feed water can freely pass. The compressed air moves toward the pumped feed water through the porous tube body 532 to be dissolved.

The inner diameter or the outer diameter of the porous tube body 532 can be determined properly depending on the flow rate necessary for water treatment, the degree of the compressed air dissolved in water, operation pressure and others, and preferably, at least one tube body is disposed inside the chamber 531.

Figure 7:
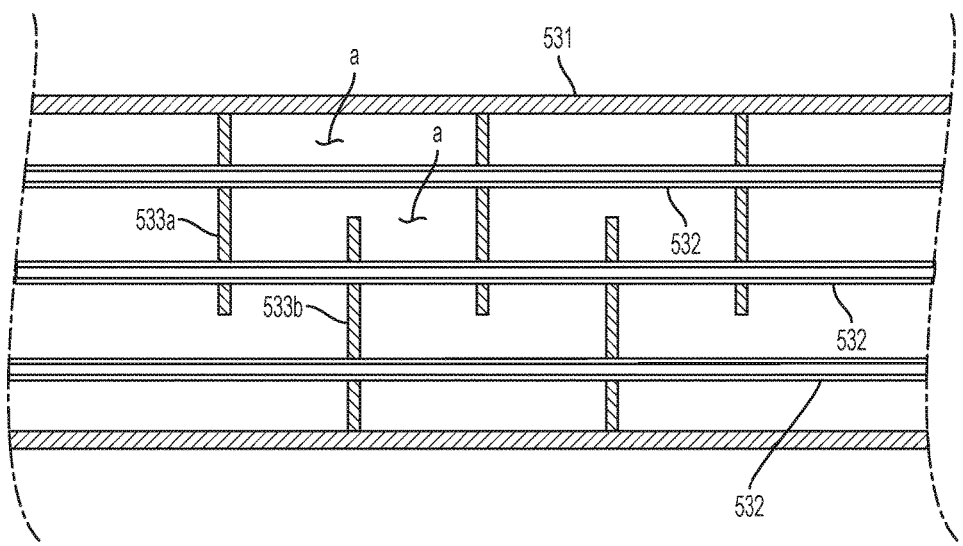
FIG. 7 is a mimetic diagram showing a state where partition walls are formed on the saturator according to an exemplary embodiment.
Figure 8:
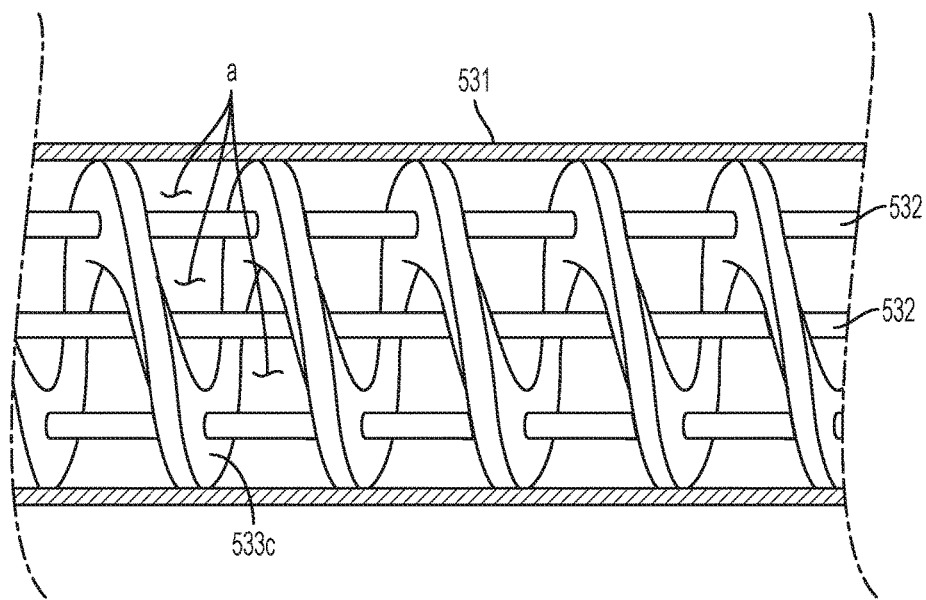
FIG. 8 is a mimetic diagram showing a state where a partition wall of the saturator according to an exemplary embodiment is formed in a spiral shape.

In the meantime, as a modification, as shown in FIG. 7, the water treatment apparatus further includes a plurality of partition walls 533 which extend toward the inner wall surface opposed to the inner wall surface of the chamber 531 in such a way that the opposed inner wall surfaces are spaced apart from each other to be opened. The porous tube body is disposed to go through the partition walls 533. Moreover, it is preferable that the spaced ends 533a and 533b of the partition walls be continuously crossed in the longitudinal direction of the chamber 531 and the porous tube body 532. Therefore, the first flow path (a) which is a flow line of the first fluid bypasses in the vertical direction of the chamber 531 by the partition walls 533a and 533b so as to increase residence time of the first fluid inside the chamber 531 and actively generate an eddy or turbulence, thereby enhancing saturation efficiency of the compressed air.

Figure 9:
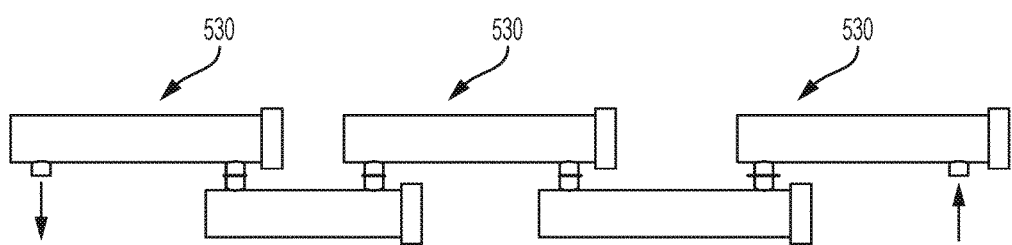
FIG. 9 is a mimetic diagram showing a state where a plurality of the saturators according to an exemplary embodiment are connected in series.

The partition wall 533 has a plurality of through holes, or spirally extends (533c) in the longitudinal direction to activate the eddy or turbulence. Furthermore, as shown in FIG. 9, a plurality of unit chambers 531 are connected in series to satisfy the degree of saturation required for the entire water treatment process.

Figure 4:
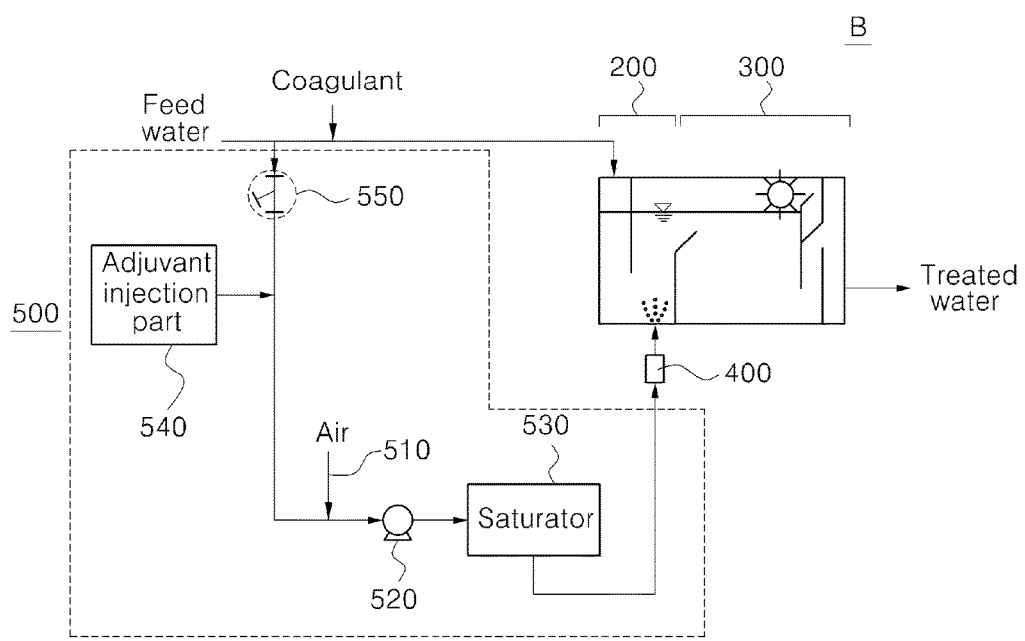
FIG. 4 is a mimetic diagram showing the whole facility of a flocculation basin exclusion type water treatment apparatus using dissolved air floatation according to an exemplary embodiment.

Meanwhile, the exemplary embodiment provides a water treatment apparatus excluding a flocculation basin, which separates some of the upstream side initial feed water by piping to form saturated water like the first and second preferred embodiments. FIG. 4 is a mimetic diagram of the entire facility of the water treatment apparatus.

Generally, the flocculation basin in a dissolved air floatation apparatus serves to grow up the size of flocs to the size suitable for floatation. Because the average diameter of the fine bubbles generated is generally 30 to 50 μm, the size of the flocs must have the size suitable for the average diameter. The flocs before being grown up in the flocculation basin are particles having the average diameter of about 10 μm, and hence, there is technical difficulty to generate fine bubbles of 10 μm or less.

Therefore, the exemplary embodiment proposes a desirable structure of a nozzle 400 to realize the water treatment apparatus excluding the flocculation basin using dissolved air floatation by generating hyperfine bubbles suitable for the size of the flocs which are not grown up in size. Therefore, the exemplary embodiment can remarkably reduce the initial installation expenses (CAPEX) required for constructing the flocculation basin and operation expenses (OPEX) required for operation of the flocculation basin.

Hereinafter, the nozzle 400 according to the exemplary embodiment will be described in detail.

According to the exemplary embodiment, the nozzle 400 includes: a housing 410 which is formed in a tube shape and has an inlet 411 formed at one side and an outlet 412 formed at the other side; a nozzle connection part 420 which is joined to the inlet 411 and has an inflow duct 421 formed in the longitudinal direction; and a nozzle body 430 which is inserted and mounted into the housing 410 and has a collision part 431 formed at a front half part to convert a flow direction of the fluid induced along the inflow duct 421 to collide with the inner wall of the housing 410, a plurality of cut portions 432 formed in the side to form a plurality of side flow paths (B) between the nozzle body and the inner wall of the housing 410, a spurt hole 433 formed at the rear half part, a collision plate 435 formed in the spurt hole 433, and an orifice 434 formed between the cut portion 432 and the spurt hole 433, such that the fluid sprayed through the orifice 434 collides against the collision plate 435.

Figure 10:
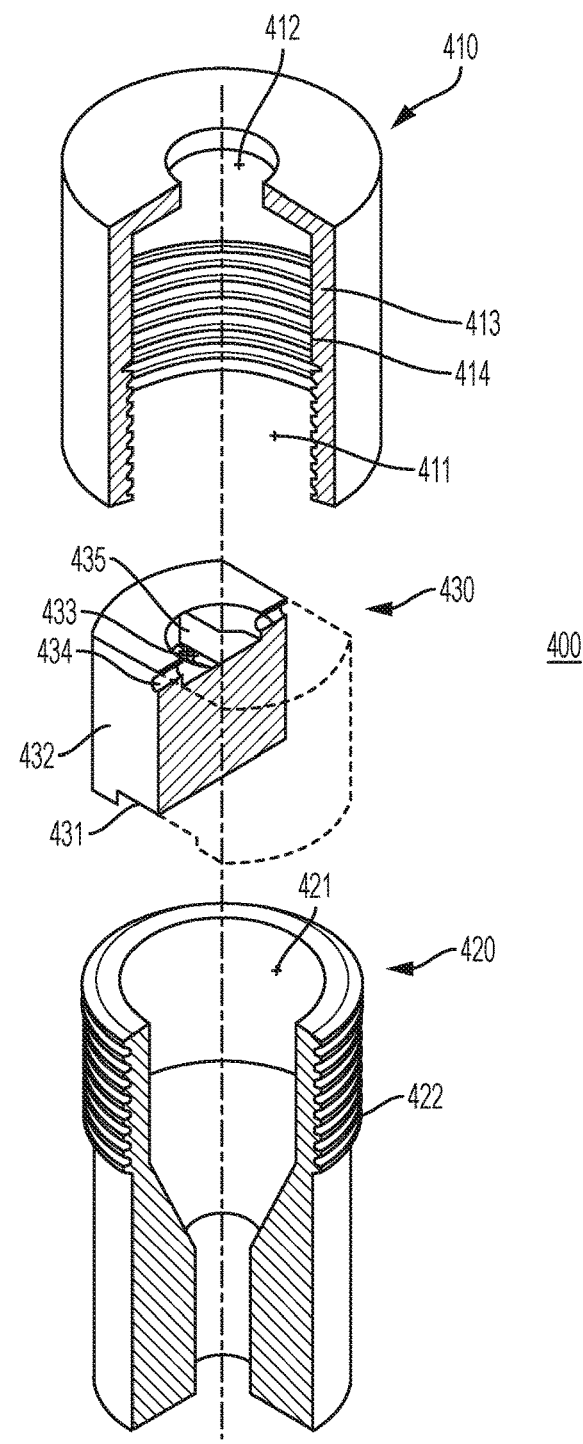
FIG. 10 is an exploded perspective view of a nozzle according to an exemplary embodiment.
Figure 11:
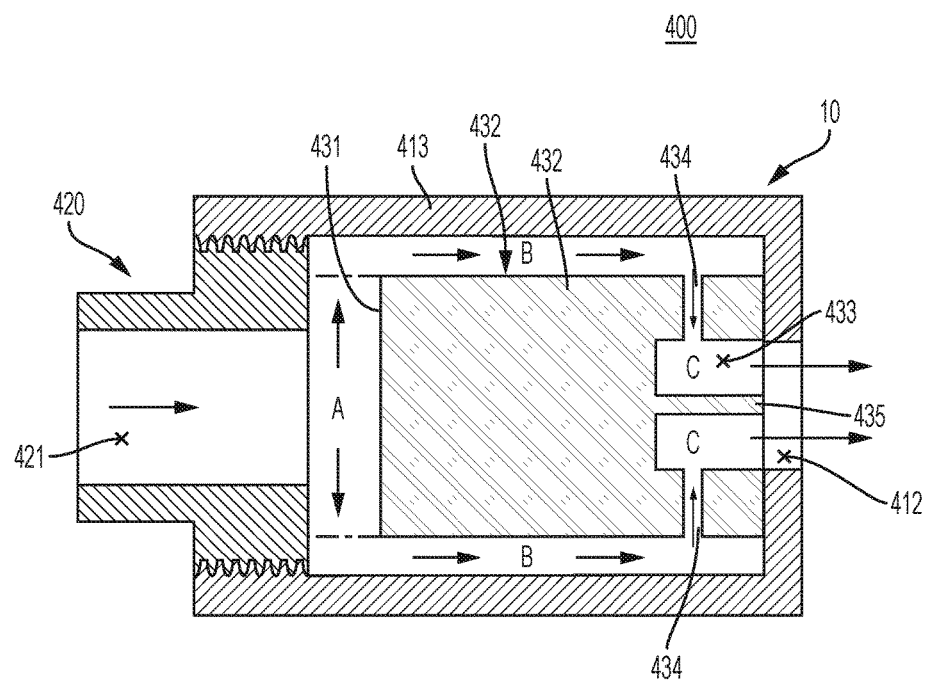
FIG. 11 is a vertically sectional view of the nozzle according to an exemplary embodiment.

FIG. 10 is an explode perspective view of the nozzle 400 according to the exemplary embodiment, and FIG. 11 is a vertically sectional view of the nozzle.

Referring to the drawings, the housing 410 may be generally formed in a tube type. One side of the housing 410 is opened, and the inlet 411 is joined to a nozzle connection part 420 which will be described later. A coupling part 414 which has a spiral thread for coupling with the nozzle connection part 420 may be formed at the inlet 411. The outlet 412 is formed at the center of the other side of the housing 410. The outlet 412 is smaller than the diameter of a side part 413 of the housing 410. That is, the outlet 412 is smaller than the inlet 411. The fluid is induced through the inlet 411 of the housing 410 and flows out through the outlet 412.

The nozzle connection part 420 is formed in a tube type and joined to the coupling part 414 of the housing 410. For this, the nozzle connection part 420 has a coupling part 422 which is formed at an end portion thereof and has a spiral thread formed on the outer circumferential surface. When the nozzle connection part 420 is joined to the housing 410, the nozzle body 430 inserted into the housing 410 can be fixed and supported.

The nozzle connection part 420 has the inflow duct 421 which goes through a central axis in the longitudinal direction. The fluid is induced into the housing 410 through the inflow duct 421. The nozzle body 430 is generally formed in a piston type. The nozzle body 430 is made of synthetic resin.

The nozzle body 430 has the collision part 431 formed at the front end portion in a flat form. The collision part 431 may be a floor surface of a receiving space (A) that is formed by a partial dent of the front end portion of the nozzle body 430. The fluid induced through the inflow duct 421 runs slack into the collision part 431, such that the flow of the fluid is changed to the perpendicular direction and the fluid runs against the inner wall of the side part 413 of the housing 410.

The nozzle body 430 has the cut portions 432 formed at both sides. The cut portions 432 may be a section formed parallel with both sides of the nozzle body 430 in the longitudinal direction. Therefore, when the nozzle body 430 is inserted into the housing 410, a space is formed between the inner wall of the side part 413 of the housing 410 and the cut portions 432 of the nozzle body 430 to form the side flow paths (B). The fluid induced through the inflow duct 421 first runs against the collision part 431 to change the direction at a right angle, second runs against the inner wall of the side part 413 of the housing 410 to change the direction at a right angle, and then, flows along the side flow paths (B). In this embodiment, because the side flow paths (B) are formed at both sides symmetrically, the fluid flows into two parts. That is, the fluid collides twice and suddenly changes the direction twice, and then, flows along two flow paths toward the rear end part of the housing 410.

The nozzle body 430 has the spurt hole 433 formed at the center of the rear end part to form a spurt space (C). The spurt hole 433 may be a cylindrical hole. The orifice 434 is formed between the cut portion 432 and the spurt hole 433 of the nozzle body 430. The orifice 434 is formed in a straight hole shape. The orifice 434 may be vertically formed in the section of the cut portion 432. The fluid induced along the side flow path (B) is sprayed toward the spurt space (C) through the orifice 434 at high speed.

The nozzle body 430 has the collision plate 435 formed at the rear end part. The collision plate 435 may be formed inside the spurt hole 433. The collision plate 435 may be formed perpendicularly to the longitudinal direction of the orifice 434. The fluid flown along the side flow path (B) into two parts is sprayed to the inside of the spurt hole 433 through the orifice 434 at high speed, and runs against both sides of the collision plate 435 three times. The fluid is decompressed while getting out of the orifice 434 and forms fine bubbles while running against the collision plate 435. The fluid changes the direction at a right angle by the collision plate 435, and then, escapes the outlet 412.

Now, the action of the nozzle 400 according to the exemplary embodiment will be described. The fluid induced through the inflow duct 421 of the nozzle connection part 420 first runs against the collision part 431 of the nozzle body 430 to change the direction, and then, is divided into two parts to spread from the center to the outside. The fluid flowing into two parts second runs against the inner wall of the side part 413 of the housing 410 to change the direction, and then, flows to the rear end part of the nozzle body 430 while flowing along the side flow paths (B). The fluid is controlled in speed and flow rate and forms turbulence by the two collisions and two changes in direction. The fluid which becomes turbulence is sprayed at high speed from the rear end part of the nozzle body 430 toward the spurt space (C) formed at the center of the rear end part of the nozzle body 430 through the orifice 434. The fluid sprayed through the orifice 434 third runs against the collision plate 435 formed in the spurt space (C) to change the direction, and then, gets out of the outlet 412. While the fluid is sprayed through the orifice 434 and runs against the collision plate 435, decompression and shock occur, and it causes fine bubbles. Fine bubbles can be easily formed even at low pressure.

By the nozzle 400 according to the exemplary embodiment, fine bubbles can be easily formed even at low pressure due to a number of the collisions and the sudden changes in direction, the fine bubbles can be formed uniformly in the small size of 10 to 20 μm, the term of existence of the formed fine bubbles in the fluid is extended. Therefore, because chances to contact between the bubbles and the flocs and contact efficiency are increased and removal efficiency of small-sized flocs is also increased, the saturator can be omitted.

Further, the embodiments discussed have been presented by way of example only and not limitation. Thus, the breadth and scope of the inventive concept(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any inventive concept(s) in this disclosure. Neither is the "Brief Summary" to be considered as a characterization of the inventive concept (s) set forth in the claims found herein. Furthermore, any reference in this disclosure to "inventive concept" in the singular should not be used to argue that there is only a single point of novelty claimed in this disclosure. Multiple exemplary embodiments may be set forth according to the limitations of the multiple claims associated with this disclosure, and the claims accordingly define the inventive concept (s), and their equivalents, that are protected thereby. In all instances, the scope of the claims shall be considered on their own merits in light of the specification, but should not be constrained by the headings set forth herein.

What is claimed is:

1. A flocculation basin inclusion type water treatment apparatus using dissolved air floatation (DAF), comprising:
   a flocculation basin configured
      to form flocs by mixing a coagulant inserted into feed water supplied to the flocculation basin and
      to grow the flocs;
   a fine bubble forming part configured to form fine bubbles by receiving a portion of the feed water supplied to the flocculation basin;
   a contact zone to which the fine bubbles are induced through a nozzle disposed at a lower part; and
   a separation zone configured to remove the flocs when the fine bubbles are attached to the flocs and the flocs float on the surface of water.

2. The water treatment apparatus according to claim 1, wherein the fine bubble forming part is configured to separate the portion of the feed water at an upstream side of the flocculation basin by piping, is configured to form saturated water using the separated portion of the feed water and is configured to supply the saturated water to the nozzle.

3. The water treatment apparatus according to claim 1, wherein the fine bubble forming part comprises:
   an intake pipe configured to supply air to a portion of the feed water;
   a mixing pump configured to pump the air and the portion of the feed water; and
   a saturator configured to saturate the air.

4. The water treatment apparatus according to claim 1, wherein the fine bubble forming part comprises:
   an adjuvant injection part configured to supply an adjuvant to make the fine bubbles have positive charges.

5. The water treatment apparatus according to claim 4, wherein the adjuvant injection part is disposed on a pipe provided between the intake pipe and the mixing pump.

6. The water treatment apparatus according to claim 4, wherein the adjuvant injection part is disposed on a pipe provided between the mixing pump and the saturator.

7. The water treatment apparatus according to claim 1, wherein the fine bubble forming part comprises:
   a strainer configured to remove solid matters through pretreatment of the separated portion of the feed water.

8. The water treatment apparatus according to claim 1, wherein the fine bubble forming part comprises:
   a mixing pump configured to pump a portion of the feed water;
   a saturator configured to saturate air pumped to the portion of feed water; and
   an air compressor configured to supply compressed air to the saturator.

9. The water treatment apparatus according to claim 8, wherein the fine bubble forming part comprises:
   an adjuvant injection part configured to supply an adjuvant to make the fine bubbles have positive charges.

10. The water treatment apparatus according to claim 9, wherein the adjuvant injection part is disposed on a pipe of an upstream side of the mixing pump.

11. The water treatment apparatus according to claim 9, wherein the adjuvant injection part is disposed on a pipe provided between the mixing pump and the saturator.

12. The water treatment apparatus according to claim 8, wherein the saturator comprises:
   a chamber comprising a first flow path in which a first fluid flows; and
   a porous tube body arranged inside the chamber, extending in a parallel direction with the first flow path and comprising a second flow path in which a second fluid flows,
   wherein the first fluid and the second fluid are compressed air and the pumped feed water, respectively or the pumped feed water and compressed air, respectively, and
   wherein the porous tube body is configured to prevent the pumped feed water from passing and configured to allow passing of the compressed air.

13. The water treatment apparatus according to claim 4, wherein the adjuvant injection part is disposed on a pipe provided at an upstream side of the intake pipe.

14. A flocculation basin exclusion type water treatment apparatus using dissolved air floatation (DAF) which includes:
   a contact zone to which fine bubbles are supplied through a nozzle disposed at a lower part and which supplies the fine bubbles to flocs formed in feed water to which a coagulant is mixed; and
   a separation zone which removes the flocs when the fine bubbles are attached to the flocs and the flocs float on the surface of water,
   the flocculation basin exclusion type water treatment apparatus comprising a fine bubble forming part,
   wherein the nozzle comprises:
      a housing which is formed in a tube shape and has an inlet formed at a first side and an outlet formed at a second side opposite from the first side;
      a nozzle connection part which is joined to the inlet and has an inflow duct formed in a longitudinal direction; and
      a nozzle body which is inserted and mounted into the housing and comprises:
         a collision part formed at a first half part to change a flow direction of fluid induced along the inflow duct to collide with an inner wall of the housing,
         a plurality of cut portions formed in a side of the nozzle body to form a plurality of side flow paths between the nozzle body and the inner wall of the housing,
         a spurt hole provided at a second half part opposite to the first half part,
         a collision plate provided in the spurt hole, and
         an orifice provided between a cut portion of the plurality of cut portions and the spurt hole, such that fluid sprayed through the orifice collides against the collision plate.

15. The water treatment apparatus according to claim 14, wherein the fine bubble forming part comprises:
   an intake pipe configured to supply air to a portion of the feed water;
   a mixing pump configured to pump the supplied air and the portion of the feed water; and
   a saturator configured to saturate the supplied air pumped to the separated portion of the feed water.

16. The water treatment apparatus according to claim 15, wherein the fine bubble forming part further comprises:
   an adjuvant injection part configured to supply an adjuvant to make the fine bubbles have positive charges.

17. The water treatment apparatus according to claim 15, wherein the fine bubble forming part further comprises:
   a strainer configured to remove solid matters through pretreatment of the separated portion of the feed water.

18. The water treatment apparatus according to claim 14, wherein the fine bubble forming part is configured to separate a portion of the feed water at an upstream side of the flocculation basin by piping, configured to form saturated water using the separated portion of the feed water and configured to supply the saturated water to the nozzle.

* * * * *